United States Patent [19]
Nguyen et al.

[11] Patent Number: 5,732,236
[45] Date of Patent: Mar. 24, 1998

[54] CIRCUIT AND METHOD FOR CONTROLLING ACCESS TO PAGED DRAM BANKS WITH REQUEST PRIORITIZATION AND IMPROVED PRECHARGE SCHEDULE

[75] Inventors: Van Minh Nguyen; Patrick W. Bosshart, both of Plano, Tex.

[73] Assignee: Texas Instruments Incorporated, Dallas, Tex.

[21] Appl. No.: 68,819

[22] Filed: May 28, 1993

[51] Int. Cl.$^6$ .................................. G06F 12/06
[52] U.S. Cl. .................. 395/405; 395/496; 395/478
[58] Field of Search .......................... 364/200 MS File, 364/900 MS File; 395/425, 400, 427, 401, 405, 496, 478, 432

[56] References Cited

U.S. PATENT DOCUMENTS

| | | | |
|---|---|---|---|
| 4,254,463 | 3/1981 | Busby et al. | 395/405 |
| 5,034,917 | 7/1991 | Bland et al. | 395/494 |
| 5,184,320 | 2/1993 | Dye | 365/49 |
| 5,291,580 | 3/1994 | Bowden, III et al. | 395/405 |
| 5,301,278 | 4/1994 | Bowater et al. | 395/405 |
| 5,301,299 | 4/1994 | Pawlowski et al. | 395/405 |
| 5,335,336 | 8/1994 | Kametani | 395/433 |

OTHER PUBLICATIONS

Goodman, Mix and match micros and memory, ESD: The Electronic System Design Magazine, v18, n11, p. 99(5), Nov., 1988.

*Primary Examiner*—Matthew M. Kim
*Attorney, Agent, or Firm*—Carlton H. Hoel; W. James Brady; Richard L. Donaldson

[57] ABSTRACT

A DRAM controller (18) for controlling access to a system memory (11) is provided. Prioritizer circuit (38) causes a first plurality of buffers (42) to pass an address signal (46) for a first requesting circuit to a primary address bus (48) and a second plurality of buffers (44) to pass an address signal (46) for a next requesting circuit to a secondary address bus (50). The pages requested on primary address bus (48) and secondary address bus (50) are compared with the active page of each memory bank (11) stored in registers (52), (54), (56), and (58) by first and second plurality of comparators (60) and (70) to determine if the pages are active. The output of each of the first and second plurality of comparators (60) and (70) is coupled to a corresponding bank controller in a plurality of bank controllers (84) to produce control signals on control lines (26). A first bank decoder (80) enables an appropriate one of the plurality of bank controllers (84) to precharge an appropriate control line (26) corresponding to input from first plurality of comparators (60). The first requesting circuit signals DRAM controller (18) through a multiplexer (94) that the first requesting circuit is ready to finish accessing system memory (11) thereby allowing second bank decoder (82) to enable an appropriate one of the plurality of bank controllers (84) to precharge an appropriate control line (26) corresponding to input from second plurality of comparators (70).

3 Claims, 4 Drawing Sheets

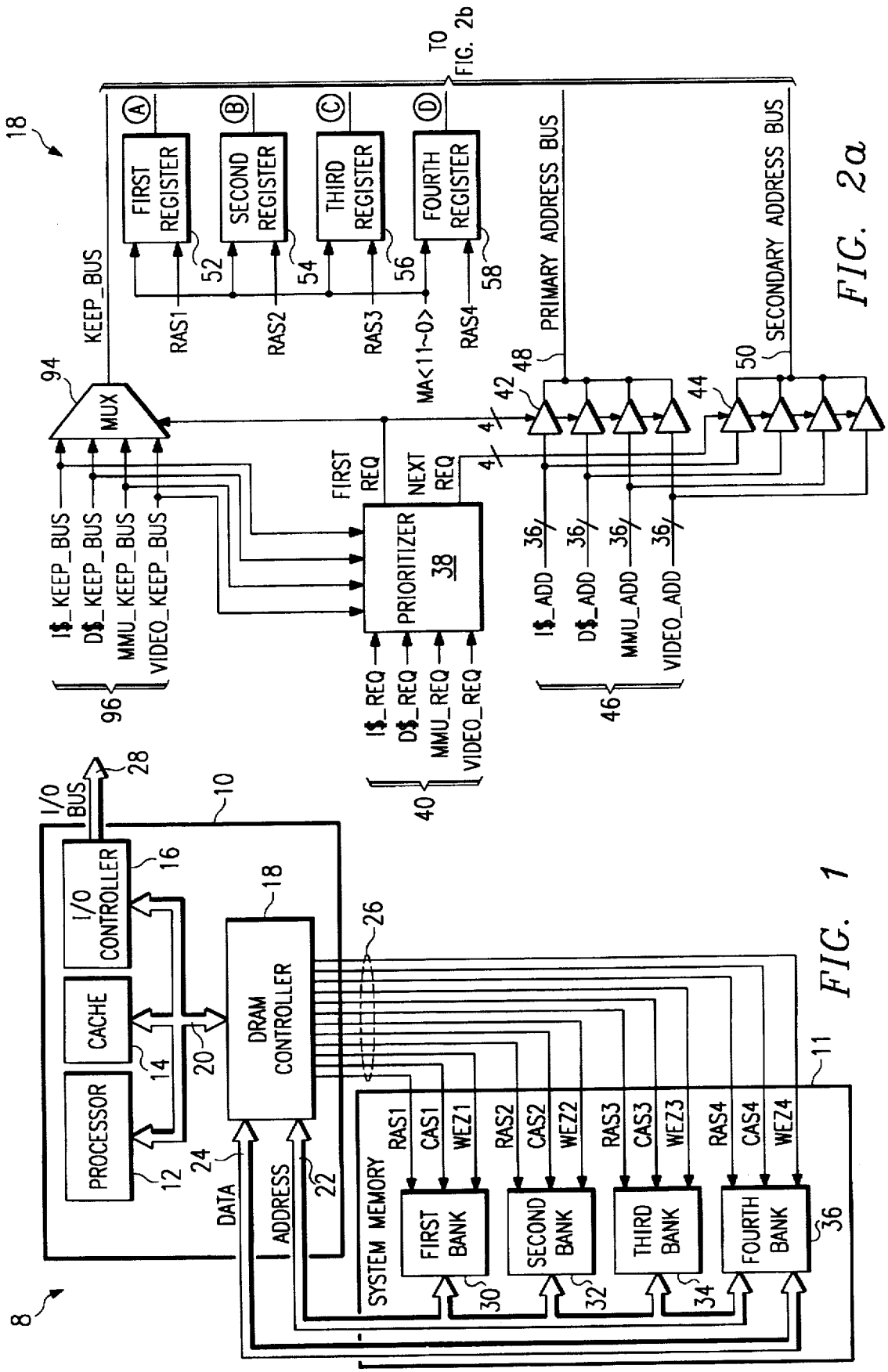

CIRCUIT AND METHOD FOR CONTROLLING ACCESS TO PAGED DRAM BANKS WITH REQUEST PRIORITIZATION AND IMPROVED PRECHARGE SCHEDULE

TECHNICAL FIELD OF THE INVENTION

This invention relates in general to the field of electronic devices, and more particularly, to a circuit and method for controlling access to a system memory.

BACKGROUND OF THE INVENTION

Microprocessor-based systems typically comprise a main memory, hereinafter system memory, associated with the microprocessor. Often, a plurality of dynamic random access memory (DRAM) units are used for the system memory and are controlled by a DRAM controller on the microprocessor. Alternatively, the DRAM controller may be fabricated on a different semiconductor substrate from the microprocessor. When viewed in light of the increasing speed of microprocessors, accessing data in the system memory is very time consuming. Consequently, the semiconductor industry expends great amounts of resources in an effort to reduce the time required to access data from a system memory.

For performance reasons, the system memory is usually partitioned into a plurality of memory banks sharing the same address and data buses. Each bank is divided in turn into a plurality of separate "pages." Typically, each page of a bank corresponds to a separate row of data. DRAMs have a "page mode". When a series of requests for access to the system memory are all on the same page in the same bank of the system memory, the page mode substantially decreases the access time. For example, a non-page mode access may require up to three times as long to perform as a page mode access.

One prior solution to reduce the time for accessing memory is commonly referred to as interleaving. According to this technique, a DRAM controller causes one bank of the system memory to precharge the column Address Strobe line while the DRAM controller accesses a piece of data in another bank. This technique assumes that the next data request will be in a different bank from the current data request. This is not always the case.

The time required to access a memory location in the system memory comprises several components some of which are specific to the particular system memory being accessed. In general, however, two major components to the time required for accessing a memory location in a large number of systems are the time required to bring in a valid row address from an address bus and the time required to bring in a valid column address from the address bus. The control signal Row Address Strobe (RAS) determines whether a valid row address has been placed on the address bus and the control signal Column Address Strobe (CAS) determines whether a valid column address has been placed on the address bus. The time components identified above for accessing the system memory are due to the time required to perform the assigned functions associated with these control signals.

SUMMARY OF THE INVENTION

In accordance with the present invention, a circuit and method for controlling access to a memory device is provided which substantially eliminates or reduces disadvantages and problems associated with prior circuits and methods. More specifically, the present invention provides a circuit for controlling access by a plurality of requesting circuits to a system memory having a plurality of memory banks each divided into a plurality of pages. The controlling circuit comprises first determining circuitry, second determining circuitry, and bank controller circuitry. One of the plurality of requesting circuits provides a first request for access to the system memory to the first determining circuitry. The first determining circuitry determines whether the page of the bank requested by the first requesting circuit is active. If the requested page is not active, the bank controller circuitry precharges a control line for the bank containing the requested page to retrieve the address for the requested page. Another one of the plurality of requesting circuits provides a next request to the second determining circuitry. The second determining circuitry determines whether a subsequent page requested by the next requesting circuit is active. If the subsequent page is not active, the bank controller circuitry precharges a control line for the bank containing the subsequent page to prepare the DRAM for accesing the subsequent page prior to the first requesting circuit finishing accessing memory.

A technical advantage of the present invention inheres in the fact that it reduces the time required to access a system memory by precharging a control line for a next requesting circuit while executing an access for a first requesting circuit.

Another technical advantage of the present invention inheres in the fact that it allows a series of requests for access to system memory and takes advantage of the fact that each series of requests will likely be on the same page in memory.

Another technical advantage of the present invention inheres in the fact that it provides a cost-effective approach to reducing the time necessary to access a system memory.

BRIEF DESCRIPTION OF THE DRAWINGS

For a more complete understanding of the present invention and the advantages thereof, reference is now made to the following description taken in conjunction with the accompanying drawings in which like reference numbers indicate like features, and wherein:

FIG. 1 illustrates a block diagram of a processing system constructed according to the teachings of the present invention comprising a memory system implemented with dynamic random access memory (DRAM) and a microprocessor having a DRAM controller;

FIGS. 2a and 2b illustrate a block diagram of a DRAM controller constructed according to the teachings of the present invention.

DETAILED DESCRIPTION OF THE INVENTION

Figure 2B:
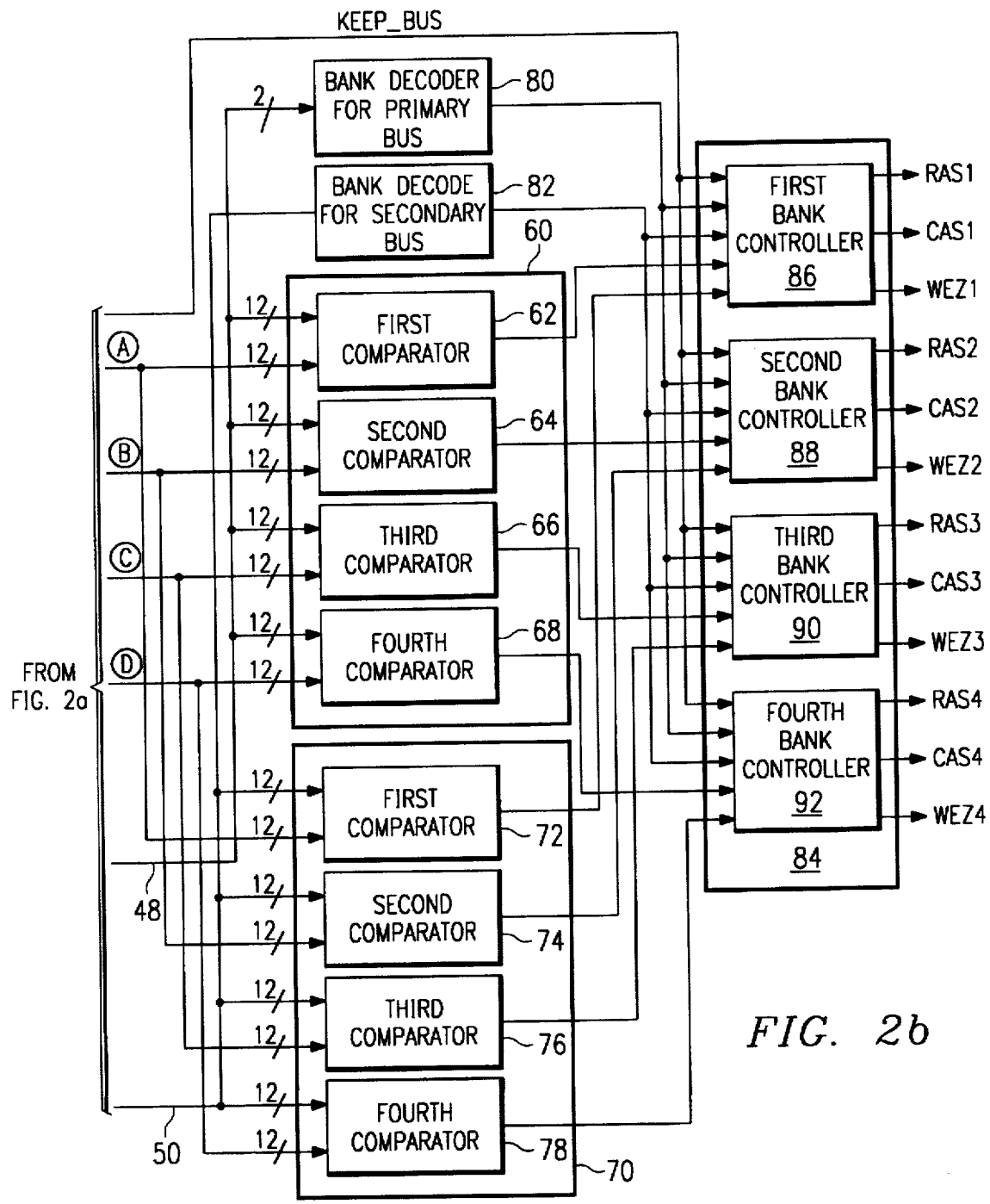

FIG. 1 illustrates a data processing system indicated generally at 8 constructed according to the teachings of the present invention that comprises a microprocessor coupled to a system memory 11 implemented with a plurality of Dynamic Random Access Memory (DRAM) units. Microprocessor 10 comprises a processor 12, a cache 14, an input/output (I/O) controller 16, and a DRAM controller 18. Processor 12, cache 14, I/O controller 16, and DRAM controller 18 are interconnected by a bus 20. DRAM controller 18 is coupled to system memory 11 by an address bus 22, a data bus 24, and a plurality of control lines 26. Microprocessor 10 is coupled to an external system by an I/O bus 28. It is noted that many features common to microprocessors, such as timing devices and interval control lines, are not shown in FIG. 1 in order to simplify the diagram to better illustrate the teachings of the present invention.

System memory 11 comprises four memory banks illustrated in FIG. 1 as first bank 30, second bank 32, third bank 34, and fourth bank 36. Each of first bank 30, second bank 32, third bank 34, and fourth bank 36 may comprise one or more DRAM units. Address bus 22 and data bus 24 are coupled to each of first bank 30, second bank 32, third bank 34, fourth bank 36 and DRAM controller 18. Additionally, each bank 30, 32, 34, and 36 is coupled to DRAM controller 18 by three control lines 26, namely Row Address Strobe (RASn), column address strobe (CASn), and write enable bar (WEZn). Note that the small n in each of the control line abbreviations is used to illustrate that there are four separate control lines performing the same function for the four banks of system memory 11. For example, the Row Address Strobe for first bank 30 will be referred to herein as RAS1.

In operation, processor 12, cache 14, or I/O controller 16 may access a specific memory location in system memory 11 through DRAM controller 18. In this sense, each of processor 12, cache 14, and I/O controller 16 may be referred to generally as "requesting circuits." For example, cache 14, a first requesting circuit, may need to access Page 1 of first bank 30 in system memory 11. Cache 14 communicates its request to access system memory 11 to DRAM controller 18. DRAM controller 18 determines whether Page 1 of first bank 30 is "active".

A specific memory location in system memory 11 may be accessed if the appropriate row and column of the memory location are "active." As mentioned previously, each row of data in a bank of a system memory comprises a "page" of memory. Therefore, hereinafter, the row address for an access to system memory 11 will be referred to as a page. A memory location is "activated" by DRAM controller 18 precharging the appropriate RASn line by bringing it to a high logic value to bring in a page address from address bus 22. RASn is returned to a low logic level to indicate that a stable page address has been placed on address bus 22 by DRAM controller 18. The appropriate bank of system memory 11 takes the row address off address bus 22 after RASn goes to a low logic level, and the appropriate page is thus "activated." In a similar manner, CASn is brought to a high logic level to bring in the column address. When CASn is returned to a low logic level, the requesting circuit may read data from or write data to the memory location. If the last request for data was on the same page as the most recent memory access in that bank, the appropriate page is already "active" and only the column address needs to be changed.

Returning to the example, if page 1 of first bank 30 is not active, DRAM controller 18 brings RAS1 and CAS1 to a high logic value to allow first bank 30 to bring in the page and the column address from address bus 22 for the request by cache 14. RAS1 and CAS1 each go to a low logic level when the address requested by cache 14 has been placed on address bus 22. Depending on control signal WEZ1 of control lines 26, data is read from or written to data bus 24. Cache 14 may perform multiple accesses into memory system 11 until cache 14 no longer requests memory accesses.

If Page 1 of first bank 30 is active DRAM controller 18 only brings CAS1 to a high logic level to place the new column address on address bus 22 for the memory location to be accessed by cache 14. Once CAS1 goes to a low logic level, data is read from or written to data bus 24 depending on control signal WEZ1 of control lines 26.

Meanwhile, a next requesting circuit, for example, processor 12, may need to access system memory 11. For example, processor 12 may need to access Page 2 of third bank 34. While cache 14 is accessing first bank 30, DRAM controller 18 continuously determines if Page 2 of third bank 34 is active. When cache 14 signals DRAM controller 18 that it will release DRAM controller 18, DRAM controller 18 precharges RAS3 if page 2 of third bank 34 is not already active prior to cache 14 finishing accessing DRAM 11. In this manner, DRAM controller 18 reduces the time required to access a memory location in system memory 11 by precharging the appropriate RASn control line for a next requesting circuit while still performing a memory access for a first requesting circuit.

FIGS. 2a and 2b illustrate an embodiment of a DRAM controller circuit indicated generally at 18 and constructed according to the teachings of the present invention. DRAM controller circuit 18 comprises a prioritizer circuit 38 operable to receive a plurality of request signals 40 from components of the system such as processor 12, cache 14, and I/O controller 16 of FIG. 1; referred to generally as "requesting circuits." Request signals 40 may comprise, for example an instruction cache request signal, hereinafter I$_REQ; a data cache request signal, hereinafter D$_REQ; a memory management unit request signal, hereinafter MMU_REQ; and a video module request signal, hereinafter VIDEO_REQ.

Prioritizer circuit 38 provides 4 bit output signals labelled FIRST_REQ and NEXT_REQ to control first and second plurality of buffers 42 and 44. Prioritizer 38 may comprise conventional combinational logic to order request signals 40 according to a predetermined priority. The requesting circuit having the highest priority or being currently served by DRAM controller 18 is referred to hereinafter as "the first requesting circuit." The requesting circuit having the next highest priority or requesting access to system memory 11 while DRAM controller 18 is serving a first requesting circuit is referred to hereinafter as "the next requesting circuit."

First and second plurality of buffers 42 and 44 are coupled to receive 36 bit input address signals 46 from the requesting circuits. Address signals 46 may comprise, for example: an instruction cache address, hereinafter I$_ADD; a data cache address, hereinafter D$_ADD; a memory management unit address, hereinafter MMU_ADD; and a video module address hereinafter VIDEO_ADD.

The output of each of first plurality of buffers 42 is coupled to a primary address bus 48 while the output of each of the second plurality of buffers 44 is coupled to a secondary address bus 50. Signal FIRST_REQ of prioritizer circuit 38 controls the first plurality of buffers 42 to couple the address signal 46 from the first requesting circuit to primary address bus 48. Similarly, signal NEXT_REQ of prioritizer circuit 38 controls the second plurality of buffers 44 to couple the address signal 46 from the next requesting circuit to secondary address bus 50.

DRAM controller 18 keeps track of the page that is active in each of first bank 30, second bank 32, third bank 34, and fourth bank 36 by using corresponding first register 52, second register 54, third register 56, and fourth register 58. Each of first, second, third, and fourth registers 52, 54, 56, and 58 are coupled to receive a 12-bit multiplexed address signal from address bus 22 corresponding to the current row to be accessed in system memory 11. Each register 52, 54, 56, and 58 is also coupled to receive one of the RASn control lines 26. As a specific page is activated by bringing one of the RASn signals of control lines 26 to a low logic level, the row address of the multiplexed signal is stored in the appropriate register of registers 52, 54, 56, and 58.

The decision as to whether the page in system memory 11 requested by a first requesting circuit is active is made by a first plurality of comparators 60. First plurality of comparators 60 comprises first comparator 62, second comparator 64, third comparator 66, and fourth comparator 68. Each of the first plurality of comparators 60 is coupled to receive a 12-bit signal from primary bus 48 corresponding to the page requested by the first requesting circuit. Additionally, first comparator 62 is connected to receive a 12-bit signal corresponding to the active page of first bank 30 from first register 52. Second comparator 64 is coupled to receive a 12-bit signal corresponding to the active page of second bank 32 from second register 54. Third comparator 66 is coupled to receive a 12-bit signal corresponding to the active page of third bank 34 from third register 56. Finally, fourth comparator 68 is coupled to receive a 12-bit signal corresponding to the active page of fourth bank 36 from fourth register 58.

The decision as to whether the page in system memory 11 requested by a second requesting circuit is active is made by a second plurality of comparators 70. Second plurality of comparators 70 comprises first comparator 72, second comparator 74, third comparator 76 and fourth comparator 78. Each of Second plurality of comparators 70 is coupled to receive a 12-bit signal from secondary bus 50 corresponding a page address requested by the next requesting circuit. Additionally, first comparator 72 is coupled to receive a 12-bit signal corresponding to the active page of first bank 30 from first register 52. Second comparator 74 is coupled to receive a 12-bit signal corresponding to the active page of second bank 32 from second register 54. Third register 76 is coupled to receive a 12-bit signal corresponding to the active page of third bank 34 from third register 56. Finally, fourth comparator 78 is coupled to receive a 12-bit signal corresponding to the active page of fourth bank 36 from fourth register 58.

The memory bank of system memory 11 corresponding to the request by the first requesting circuit is decoded from primary bus 48 in first bank decoder 80. The bank of system memory 11 corresponding to the address requested by the next requesting circuit is decoded from secondary address bus 50 in second bank decoder 82.

First bank 30, second bank 32, third bank 34, and fourth bank 36 of system memory 11 are controlled by control signals produced by a plurality of memory bank controllers 84. Plurality of memory of bank controllers 84 comprises first bank controller 86, second bank controller 88, third bank controller 90, and fourth bank controller 92. First bank controller 86 is coupled to first and second bank decoders 80 and 82, first comparator 62, and first comparator 72. The second bank controller 88 is coupled to first and second bank decoders 80 and 82, second comparator 64, and second comparator 74. Third bank controller 90 is coupled to first and second bank decoders 80 and 82, third comparator 66, and third comparator 76. Fourth bank controller 92 is coupled to first and second bank decoders 80 and 82, fourth comparator 68, and fourth comparator 78. Additionally, each of the plurality of memory bank controllers 84 is coupled to receive a signal KEEP_BUS from a multiplexer 94. Multiplexer 94 is controlled by signal FIRST_REQ from prioritizer Circuit 38.

Multiplexer 94 is coupled to receive a plurality of KEEP_BUS signals 96 from the requesting circuits. KEEP_BUS signals 96 indicate to DRAM controller 18 whether the first requesting circuit is ready to terminate its series of memory accesses. Plurality of KEEP_BUS signals 96 may comprise, for example: an instruction cache KEEP_BUS signal, hereinafter I$_KEEP_BUS; data cache KEEP_BUS signal hereinafter D$_KEEP_BUS; memory management unit KEEP_BUS signal, hereinafter MMU_KEEP_BUS; and video KEEP_BUS signal, hereinafter VIDEO_KEEP_BUS. KEEP_BUS signals 96 may also be coupled to prioritizer 38 for use in prioritizing the various requesting circuits. In response to the various inputs into the plurality of memory bank controllers 84, each of the plurality of memory bank controllers 84 produces three output signals on control lines 26 to the respective memory banks of system memory 11. For example, the control signals on control lines 26 may comprise RASn, CASn and WEZn for each bank of system memory 11.

The operation of DRAM controller 18 is illustrated below by an example using data in Table 1.

TABLE 1

|  | FIRST BANK | SECOND BANK | THIRD BANK | FOURTH BANK |
| --- | --- | --- | --- | --- |
| Active Page | 10 | 2 | 6 | 10 |
| Page requested by I$ | 10 | — | — | — |
| Page requested by D$ | — | 3 | — | — |

Prioritizer circuit 38 of DRAM controller 18 receives a plurality of request signals 40 from requesting circuits. Prioritizer circuit 38 prioritizes the request signals 40 according to a predetermined priority. In this example, the instruction cache takes priority over all other requests followed by data cache, memory management unit, and video. Therefore, prioritizer circuit 38 causes the address signal 46 for the instruction cache, I$_ADD, to be connected to the primary address bus 48 by control signal FIRST_REQ. Additionally, prioritizer circuit 38 causes address signal 46 for the data cache, D$_ADD, to be connected to secondary address bus 50 by control signal NEXT_REQ.

As shown in Table 1, the address requested by the instruction cache is page 10 of first bank 30. A 12-bit signal corresponding to this page address is read from primary address bus 48 into each of the first plurality of comparators 60. The active page of each of first bank 30, second bank 32, third bank 34, and fourth bank 36 are compared with this page address provided by the primary address bus in comparators 60. Because page 10 of first bank 30 is active, the output of first comparator 62 will indicate to first bank controller 86 that the requested page is active. Note that the page requested by the instruction cache is also compared against the active page of each of the banks of system memory 11. However, only one of the plurality of memory bank controllers 84 will be enabled to control one of the banks of system memory 11. Bank decoder 80 indicates to the plurality of memory bank controllers 84 which bank of system memory 11 is to be accessed by the first requesting circuit. Similarly, bank decoder 80 and KEEP_BUS disable the other three of the plurality of memory bank controllers 84. The instruction cache maintains primary bus 48 until the instruction cache negates a KEEP_BUS signal 96 to multiplexer 94 indicating that the instruction cache is about to terminate its series of memory accesses. In this manner, the instruction cache is capable of performing a series of memory accesses.

Meanwhile, the page requested by the data cache on secondary bus 50 is communicated to the second plurality of comparators 70. In this example, the data cache has requested page 3 of second bank 32. Second comparator 74 will indicate to second bank controller 88 that the data cache has requested access to a page that is not active. Similarly to the first plurality of comparators 60, each of the second plurality of comparators 70 will compare the active page of each of the banks of system memory 11 with the page requested by the data cache. Additionally, only one of the plurality of memory bank controllers 84 will be enabled to provide appropriate control signals to system memory 11 by bank decoder 82. Additionally, for the address requested on the secondary bus, the plurality of memory bank controllers 84 will not provide control signals via control lines 26 to system memory 11 until KEEP_BUS of the first requesting circuit has been negated. At that point, the second bank 32 will be precharged prior to the instruction cache finishing accessing system memory 11 to get ready for Page 3.

Figure 3A:
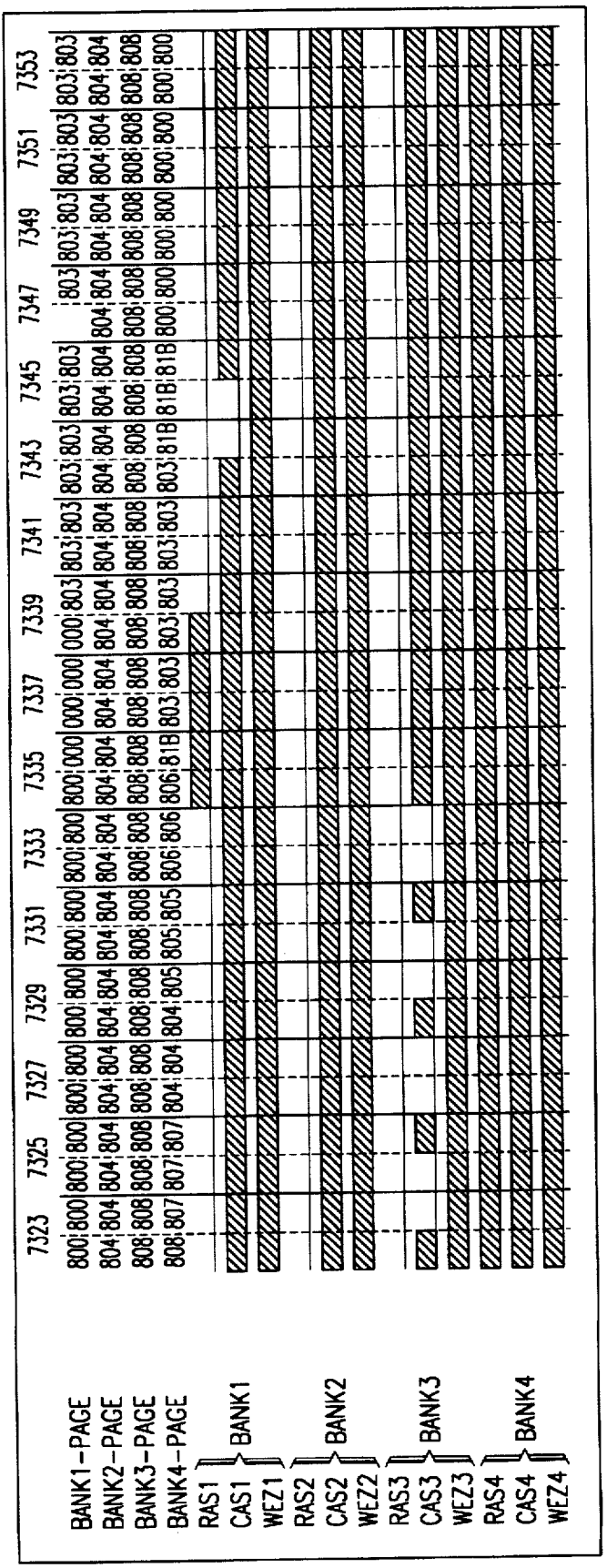
FIGS. 3a and 3b illustrate timing diagrams for a DRAM controller constructed according to the teachings of the present invention.
Figure 3B:
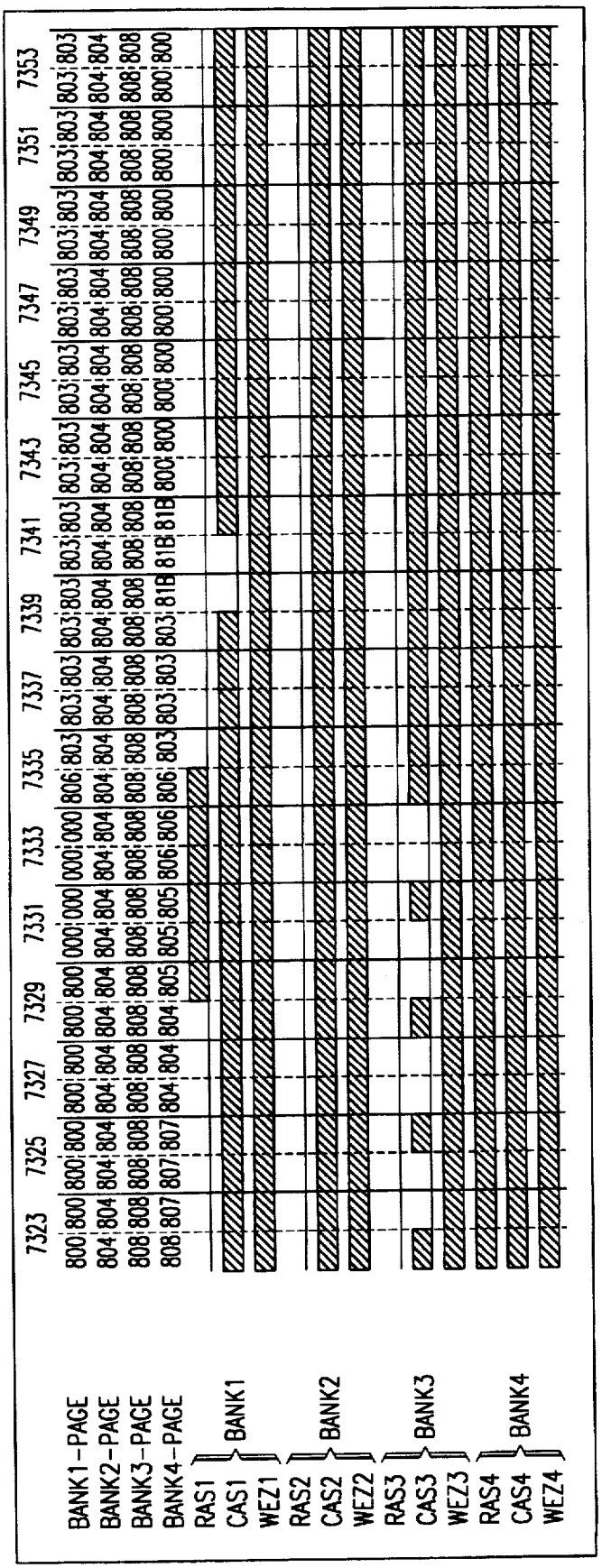

FIG. 3a illustrates a timing diagram for DRAM controller 18 with secondary address bus 50 disabled. The timing diagram begins at time 7323 with a series of four memory accesses in third bank 34 by a requesting circuit. Each requested access is on page 808 of third bank 34. Therefore, third bank controller 90 causes CAS3 to alternate between high and low logic levels to bring in the appropriate column addresses from address bus 22. At time 7335, the requesting circuit requests access to page 803 of first bank 30. The active page of first bank 30 is page 800. Therefore, first bank controller 86 precharges RAS1 to a high logic level and the appropriate page address is placed on address bus 22. First bank controller 86 brings RAS1 back to a low logic level and first bank 30 brings in the appropriate page from address bus 22. Additionally, first bank controller 86 causes CAS1 to go to a high logic level to bring the appropriate column address in from address bus 22. The memory access then begins at time 7335 and ends at time 7346. Therefore, the total time required to access data in system memory 11 is 11 time units in this example. As shown in FIG. 3b, the time required to perform the same memory access is reduced by 4 time units by enabling secondary address bus 50.

FIG. 3b illustrates a timing diagram for DRAM controller 18 with secondary address bus 50 enabled. The timing diagram begins at time 7323 with a series of four memory accesses in third bank 34 by a first requesting circuit. Each access is on page 808 of third bank 34. Therefore, third bank controller 90 causes CAS3 to alternate between a high and low logic levels to bring in the appropriate column address from address bus 22. Before the first requesting circuit has finished accessing system memory 11, the first requesting circuit negates its KEEP_BUS signal to multiplexer 94 and prioritizer 38 indicates that the first requesting circuit will terminate its memory accesses. With this KEEP_BUS signal, DRAM controller 18 allows a next requesting circuit to precharge an RASn control line 26 before the first requesting circuit finishes accessing system memory 11. At time 7330, first bank controller 86 precharges RAS1 to a high logic level and the appropriate page address requested by the subsequent requesting circuit is placed on address bus 22 at time 7335. First bank controller brings RAS1 back to a low logic level and first bank 30 brings the appropriate page address from address bus 22. The memory access for the subsequent requesting circuit begins at time 7335 and ends at 7342. The total access time required to change from accessing page 808 of third bank 34 to accessing 803 of first bank 30 is seven time units. Therefore, the total time required to perform the memory access is reduced by four time units with the secondary address bus enabled.

Although the present invention has been described in detail, it should be understood that various changes, substitutions and alterations can be made hereto without departing the spirit and scope of the invention as defined by the appended claims.

What is claimed is:

1. A memory controller for a memory including a plurality of memory banks, comprising:

an input for receiving memory access requests;

a primary address bus for memory bank and page addresses of a primary memory access request;

a secondary address bus for memory bank and page addresses of a secondary memory access request;

a first memory bank controller with inputs coupled to said primary address bus and said secondary address bus and with outputs coupled to a first memory bank;

a second memory bank controller with inputs coupled to said primary address bus and said secondary address bus and with outputs coupled to a second memory bank;

a prioritizer for prioritizing memory access requests and selecting addresses for said primary and secondary address busses; and wherein when an address on said secondary address bus is for a first page in said first memory bank and an address on said primary address bus is for a second page in said second memory bank, said first memory bank controller insures said first page is active prior to completion of said primary memory access request.

2. The controller of claim 1, wherein:

registers maintain active page information for each of said memory banks; and comparators compare active page information of said registers to the page address on said secondary address bus.

3. The controller of claim 1, wherein:

said memory bank controllers provide RAS and CAS signals to corresponding memory banks.

* * * * *